(12) United States Patent
Hawkins et al.

(10) Patent No.: US 7,946,430 B2
(45) Date of Patent: May 24, 2011

(54) FILTER WITH PROTRUDING MEMBER FOR ENGAGING VALVE IN HEAD

(75) Inventors: Charles W. Hawkins, Sparta, TN (US); Zemin Jiang, Cookeville, TN (US); Yiming Jiang, Cookeville, TN (US); Barry M. Verdegan, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1038 days.

(21) Appl. No.: 11/803,568

(22) Filed: May 15, 2007

(65) Prior Publication Data

US 2008/0283463 A1 Nov. 20, 2008

(51) Int. Cl.
*B01D 35/14* (2006.01)

(52) U.S. Cl. .......... 210/440; 55/490; 210/232; 210/420; 210/429; 210/437; 210/443; 210/444; 210/450

(58) Field of Classification Search .............. 210/90, 210/97, 117, 130, 133, 136, 420, 424, 429, 210/430, 437, 440–444, 450, 232; 55/490
See application file for complete search history.

(56) References Cited

U.S. PATENT DOCUMENTS

| | | | |
|---|---|---|---|
| 1,526,991 A | 2/1925 | Lambert | |
| 4,011,848 A | 3/1977 | Coddington | |
| 4,267,859 A | 5/1981 | Dykzeul | |
| 4,735,716 A * | 4/1988 | Petrucci et al. | 210/232 |
| 5,163,468 A | 11/1992 | Robinson et al. | |
| 5,290,738 A | 3/1994 | Tomishima et al. | |
| 5,322,041 A | 6/1994 | Niemeier et al. | |
| 5,327,862 A * | 7/1994 | Bedi | 123/196 R |
| 5,456,830 A * | 10/1995 | Stanford et al. | 210/235 |
| 5,692,723 A | 12/1997 | Baxter et al. | |
| 5,766,463 A | 6/1998 | Janik et al. | |
| 5,809,977 A | 9/1998 | Krimmer et al. | |
| 5,836,350 A | 11/1998 | Sakaguchi et al. | |
| 6,105,609 A | 8/2000 | Polidan et al. | |
| 6,354,283 B1 | 3/2002 | Hawkins et al. | |
| 6,391,197 B1 * | 5/2002 | Billiet | 210/232 |
| 6,446,597 B1 | 9/2002 | McAlister | |
| 6,478,018 B2 | 11/2002 | Fedorowicz et al. | |
| 6,478,019 B2 | 11/2002 | Fedorowicz | |
| 6,569,326 B1 * | 5/2003 | Baumann et al. | 210/232 |
| 6,576,045 B2 | 6/2003 | Liu et al. | |
| 6,601,385 B2 | 8/2003 | Verdegan et al. | |
| 6,723,239 B2 | 4/2004 | Maxwell | |
| 7,195,122 B2 * | 3/2007 | Hiranaga et al. | 210/436 |

(Continued)

FOREIGN PATENT DOCUMENTS

WO PCT/US2008/006228 11/2008

*Primary Examiner* — Joseph W Drodge

(74) *Attorney, Agent, or Firm* — Hamre, Schumann, Mueller & Larson, P.C.; J. Bruce Schelkopf

(57) ABSTRACT

A fuel filtration apparatus for use in an internal combustion engine comprises an interrupter valve in a flow path from an inlet port of a filter head to a compliant filter. The interrupter valve has an open state and a closed state. In the open state a protruding member of the filter depresses a bottom end of the valve and opens the flow path when the compliant filter is connected to the filter head. The interrupter valve also has a closed state wherein the flow path is closed in the absence of the protruding member of the filter (as with a non-compliant filter).

12 Claims, 14 Drawing Sheets

U.S. PATENT DOCUMENTS

| | | |
|---|---|---|
| 7,344,582 B2 * | 3/2008 | Pearson et al. .................. 55/504 |
| 7,771,595 B2 * | 8/2010 | Reynolds et al. ............. 210/232 |
| 2002/0066424 A1 | 6/2002 | Fedorowicz et al. |
| 2002/0100464 A1 | 8/2002 | Fedorowicz et al. |
| 2002/0108654 A1 | 8/2002 | Vreeland et al. |
| 2002/0108655 A1 | 8/2002 | Vreeland |
| 2004/0175600 A1 * | 9/2004 | Arthur et al. .................... 429/17 |
| 2006/0059875 A1 | 3/2006 | Malgorn et al. |
| 2006/0062699 A1 | 3/2006 | Evenstad et al. |

* cited by examiner

FILTER WITH PROTRUDING MEMBER FOR ENGAGING VALVE IN HEAD

CROSS-REFERENCE TO RELATED APPLICATION

This application relates to the application titled "Filter Assembly With Valve Requiring Compliant Filter For Open Flow Path" filed on the same day as the present application and having U.S. Ser. No. 11/803,588.

BACKGROUND

The present invention relates generally to a combination of a valve and filter unit that can be used, for example, with internal combustion engines, such as diesel or gasoline powered engines. Such filter units are important since various fluids, including fuels, used in vehicle engines are susceptible to being contaminated by water, sand, dirt and other particulate materials.

Original equipment manufacturers of internal combustion engines, such as diesel engines, sell such engines with filter components that are optimally designed for use with such engines. In the aftermarket, however, substitute filter components of lesser and/or inferior quality may be substituted inadvertently or even deliberately.

Accordingly there is a need for a unique and inventive apparatus of a valve and filter according to the present invention.

SUMMARY

In a first embodiment of the present invention there is an apparatus for use in an internal combustion engine. The apparatus comprises a filter head having an inlet conduit for a fluid and an outlet conduit. The apparatus further comprises a valve with a first end and a second end. The valve is connected to the filter head so that at least a portion of the first end is within the inlet conduit of the filter head. The valve has a first mode in which the fluid flows substantially within the valve between the first end and the second end of the valve. The valve has a second mode in which the fluid does not flow substantially within the valve between the first end and the second end of the valve. The apparatus further comprises a canister with a wall extending substantially along an axis between a head end and a base end. An interior surface of the wall defines an interior cavity that is open on the head end. The interior cavity is fluidly connected to the inlet conduit of the filter head through the valve in the first mode. The apparatus further comprises a filter cartridge positioned substantially within the interior cavity of the canister. The filter cartridge has an endplate positioned at the head end of the canister. The endplate has a top end that includes means for engaging a portion of the valve to shift the valve from the second mode to the first mode when at least one of the filter cartridge and the canister is connected to the filter head.

In one refinement of an embodiment of the invention the valve includes a retainer with a snap ring. The snap ring locks into a corresponding recess in the inlet conduit of the filter head.

In another refinement of an embodiment of the invention the apparatus further comprises a spring positioned external to at least a portion of the valve. At least part of the spring is retained within at least a portion of the inlet conduit between a first land and a second land. The first land is defined by a portion of the inlet conduit of the filter head. The second land is defined by a portion of the valve. The spring is in a first compressed state when the valve is in the first mode. The spring is in a second state when the valve is in the second mode. The second state is less compressed then the first state.

In another refinement of an embodiment of the invention the valve is a flow regulator valve. In the second mode the flow regulator valve is unseated by the spring and allows fuel to bypass the regulator valve. In the first mode the means for engaging translates a portion of the regulator valve that is movable with respect to the retainer and compresses the spring. As a result an external O-ring encircling a portion of the valve sealingly engages a portion of the inlet conduit of the filter head.

In another refinement of an embodiment of the invention the valve is a flow interrupter valve. In the first mode the valve fluidly connects the inlet conduit of the head to the filter cartridge and in the second mode the valve blocks the fluid from the inlet conduit of the filter head.

In another refinement of an embodiment of the invention the valve includes a wall extending between the first end and the second end. The wall defines a first passage and a second passage within the valve. The first passage and second passage have an internal fluid blocking barrier therebetween. The wall of the valve defines at least one opening between the first end and the internal barrier. The wall of the valve further defines at least one orifice between the second end and the internal barrier.

In another refinement of an embodiment of the invention the valve includes an external O-ring between the at least one opening and the at least one orifice. The retainer sealingly engages the external O-ring when the valve is in the second mode.

In another refinement of an embodiment of the invention the filter head includes an angled introduction surface adjacent the recess. The filter head defines at least two access holes adjacent the recess for the snap ring.

In another refinement of an embodiment of the invention the filter head includes at least one stand-off pin that is substantially adjacent to the inlet conduit.

In another refinement of an embodiment of the invention the means for engaging comprises an axial protrusion extending toward the filter head substantially around a circumferential portion of the top end at a first radius that overlaps at least a portion of the second end of the valve.

In another refinement of an embodiment of the invention the means for engaging further comprises a second axial protrusion extending toward the filter head substantially around a circumferential portion of the top end at a second radius that also overlaps at least a portion of the second end of the valve. The first radius is less than the second radius.

In another refinement of an embodiment of the invention the filter cartridge includes a substantially annular filter media surrounding a central column that is fluidly connected to an outlet for the filter cartridge. The column includes a plurality of openings. The filter cartridge has an outlet that is fluidly connected to an inlet of the filter cartridge through the plurality of openings and then through the filter media.

In another refinement of an embodiment of the invention the valve is a flow interrupter valve. In the first mode the valve fluidly connects the inlet conduit of the head to the filter cartridge. In the second mode the valve blocks the fluid from inlet conduit of the filter head from the filter cartridge. The valve has a retainer portion with a snap ring. The snap ring locks into a corresponding recess in the inlet conduit of the filter head. The apparatus further comprises a spring positioned external to at least a portion of the valve. At least part of the spring is retained within at least a portion of the inlet conduit between a first land and a second land. The first land is defined by a portion of the inlet conduit of the filter head and the second land is defined by a portion of the valve. The spring is in a first compressed state when the valve is in the first mode and the spring is in a second state when the valve is in the second mode. The second state is less compressed then the first state.

In another refinement of an embodiment of the invention the filter head includes an angled introduction surface adjacent the recess. The filter head further defines at least two access holes adjacent the recess for the snap ring. The filter head includes at least two stand-off pins that are substantially adjacent to the inlet conduit.

In another refinement of an embodiment of the invention the means for engaging a portion of the valve on the top end of the filter cartridge is radially positioned to shift the valve from the second mode to the first mode without substantial interference from a plurality of stand off pins protruding from the filter head. The plurality of pins are substantially adjacent to the inlet conduit.

In another embodiment of the invention there is a fuel filtration apparatus for use in an internal combustion engine. The fuel filtration apparatus comprises an interrupter valve having a first state and a second state. In the first state fuel may pass substantially through the valve. In the second state fuel is blocked from passing through the valve. The interrupter valve fluidly connects a fuel inlet bore of a filter head to a filter cartridge in the first state. The apparatus further comprises a spring retained between a first land and a second land. The first land is defined by a first portion of the interrupter valve. The second land is defined by a portion of the fuel inlet bore of the filter head. The apparatus further comprises a filter cartridge having a top end with a protrusion that engages a bottom end of the interrupter valve and compresses the spring to shift the valve from the second state to the first state when the filter cartridge is connected to the filter head.

In one refinement of an embodiment of the invention the interrupter valve includes a retainer with a snap ring. The snap ring locks into a corresponding recess in the fuel inlet bore of the filter head. The filter head includes an angled introduction surface adjacent the recess. The filter head includes at least one stand-off pin that is substantially adjacent to the fuel inlet bore. The filter head further defines at least two access holes adjacent the recess for the snap ring.

In another refinement of an embodiment of the invention the interrupter valve includes a wall extending between a first end and a second end. The wall defines a first passage and a second passage within the valve. The first passage and second passage have an internal fluid blocking barrier therebetween. The wall of the valve defines at least one opening between the first end and the internal barrier. The wall of the valve further defines at least one orifice between the second end and the internal barrier. The valve includes an external O-ring between the at least one opening and the at least one orifice. The retainer sealingly engages the external O-ring when the valve is in the second mode.

In another embodiment of the invention there is a fuel filtration apparatus for use in an internal combustion engine. The apparatus comprises an interrupter valve in a flow path from an inlet port of a filter head to a spin-on filter. The interrupter valve has an open state. In the open state a protruding member of the filter depresses a bottom end of the valve and opens the flow path when the spin-on filter is connected to the filter head. The interrupter valve also has a closed state wherein the flow path is closed in the absence of the protruding member of the spin-on filter.

In one refinement of an embodiment of the invention the interrupter valve is shifted to the second state in the absence of the protruding member of the spin-on filter by a spring retained between a first land and a second land. The first land is defined by a first portion of the interrupter valve. The second land is defined by a portion of the fuel inlet port of the filter head.

In another refinement of an embodiment of the invention the interrupter valve is a drop down valve. The interrupter valve is shifted to the second state in the absence of the protruding member of the spin-on filter by flow force of fuel present in the inlet port.

In another refinement of an embodiment of the invention the protruding member is substantially ring shaped.

In another refinement of an embodiment of the invention the filter head includes at least one stand-off pin that is substantially adjacent to the inlet port of the filter head.

In another embodiment of the invention there is a filter for use in a filtration assembly of an internal combustion engine. The filtration assembly includes a head having an outlet and an inlet and a valve with a first end and a second end, at least a portion of valve positioned within the inlet of the head. The valve has a first mode in which a fluid substantially flows through the interior of the valve from the first end to the second end and a second mode in which the fluid does not substantially flow through the interior of the valve from the first end to the second end. The filter comprises a canister open on a first end, the canister having a wall defining an interior cavity. The filter further comprises an endplate having a top end and a bottom end. The endplate has an inlet and an outlet both extending between the top end and the bottom end. The endplate is connected to the first end of the canister. The endplate inlet is fluidly connected to the endplate outlet through a filtration media positioned within the interior cavity. The top end of the endplate includes a first externally protruding rib substantially spanning a circumferential portion of the top end of the endplate.

In one refinement of an embodiment of the invention the filter includes a substantially annular filter media surrounding a central column that is fluidly connected to the outlet for the filter. The column includes a plurality of openings, the outlet of the filter being fluidly connected to the inlet of the filter through the plurality of openings and then through the filter media.

In another refinement of an embodiment of the invention the filter further comprises a second protruding rib substantially spanning a circumferential portion of the top end of the endplate, wherein the first rib is at a first radius, and the second rib is at a second radius.

In another refinement of an embodiment of the invention the filter is connected to the head by threading. The protruding ribs both engage a bottom end of the valve to shift the valve from the second mode to the first mode when the filter is connected to the head.

In another refinement of an embodiment of the invention the head includes at least one stand off pin. The first radius and the second radius do not overlap the stand off pin of the head.

In another refinement of an embodiment of the invention the filter is connected to the head by threading. The protruding rib engages a bottom portion of the valve to shift the valve from the second mode to the first mode when the filter is connected to the head.

In another refinement of an embodiment of the invention the first externally protruding rib substantially spans a circumferential portion of the top end of the endplate at a first radius. The head includes at least one stand-off pin. The first radius does not overlap the stand off pin of the head.

In another embodiment of the invention there is a filtration apparatus for use in an internal combustion engine. The filtration apparatus comprises an outer wall extending from an open head end to a base end. The wall defines an internal cavity. The head end includes an endplate having at least one inlet and an outlet. A filtration media is positioned within the internal cavity. The filtration media fluidly connects the at least one inlet and the outlet. The endplate further includes a first plurality of externally protruding arcuate members, the first plurality of arcuate members substantially spanning a circumferential portion of the head end at a first radius. The endplate further includes a second plurality of externally protruding arcuate members, the second plurality of arcuate members substantially spanning a circumferential portion of the head end at a second radius that is larger than the first radius.

In one refinement of an embodiment of the invention the apparatus further comprises a head substantially adjacent to the head end of the filter. The head comprises an outlet and an inlet and a valve with a first end and a second end, at least a portion of valve positioned within the inlet of the head. The valve has a first mode in which a fluid substantially flows through the interior of the valve from the first end to the second end and a second mode in which the fluid does not substantially flow through the interior of the valve from the first end to the second end. There is a spin-on connection between the filter and the head. At least one of the first and second plurality of arcuate members depress the second end of the valve to shift the valve from the second mode to the first mode.

In another refinement of an embodiment of the invention at least one arcuate member from the first plurality of arcuate members and at least one arcuate member from the second plurality of arcuate members engage the second end of the valve to shift the valve from the second mode to the first mode.

In another refinement of an embodiment of the invention the outlet of the filter is centrally located. The filtration media is a substantially annular filtration media that surrounds a central column, the central column defining a plurality of openings therein, the filter having a flow path from the filter inlet to the filter outlet that extends through the filtration media and the plurality of openings in the central column.

In another refinement of an embodiment of the invention the head further includes a spring retained in the inlet between a first land defined in the inlet and a second land defined by a portion of the valve positioned within the inlet.

In another refinement of an embodiment of the invention a portion of the head substantially adjacent the inlet includes at least one stand off pin, and wherein neither the first radius nor the second radius overlap the stand off pin.

In another embodiment of the invention there is a spin-on filter for engaging a valve in a head to shift it from a blocked state to an open state. The spin-on filter comprises a wall extending from a head end to a base end, the wall defining an internal cavity. The head end includes at least one inlet and an outlet. A filtration media is positioned within the internal cavity, the filtration media fluidly connecting the at least one inlet and the outlet. The head end includes an external protrusion member extending above a top surface of a gasket at the head end.

In one refinement of an embodiment of the invention the external protrusion member is one of a plurality of external protrusion members.

In another refinement of an embodiment of the invention each protrusion member is a finger, and wherein the plurality of fingers substantially span a circumferential portion of the head end.

In another refinement of an embodiment of the invention the filter is a composite material.

In another refinement of an embodiment of the invention the filter is a metal.

In another refinement of an embodiment of the invention the protrusion member is a ring that continuously spans a circumferential portion of the head end.

In another refinement of an embodiment of the invention the ring defines a plurality of openings.

It should be understood that many, if not all, of the refinements described above with respect to various embodiments of the present invention are equally applicable to other embodiments of the present invention described herein.

DESCRIPTION OF THE ILLUSTRATIVE EMBODIMENTS

Figure 1:
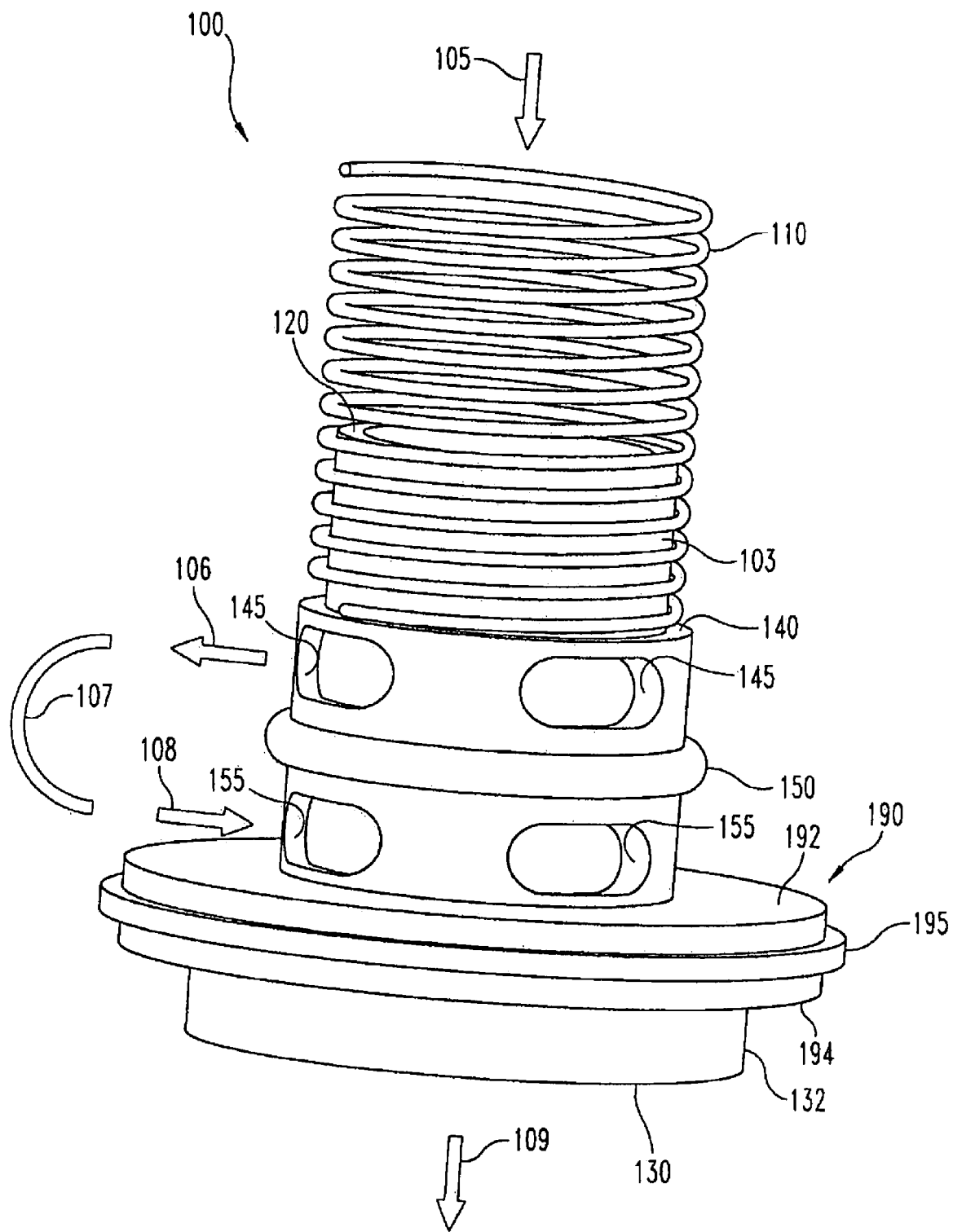
FIG. 1 is a side view of an embodiment of a fuel interrupter valve in the run condition.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the present invention relates generally to a valve that is installed into the head and prevents fuel flow to the engine unless the compliant filter is installed. Without the compliant filter in place the valve is held in a normally closed position by, for example, a spring that closes the fuel passage. When the compliant filter is installed it engages a portion of the valve which compresses the spring and therefore opens the fuel passage for normal fuel flow. If a filter with these features is not used it cannot depress the valve, and thus will not allow fuel to flow to the engine.

Another embodiment of the present invention relates generally to a valve that is installed into the head and permits fuel flow pressure regulation to the engine when the compliant filter is used. Without the compliant filter in place the valve is held in a normally opened position by, for example, a spring that unseats the valve and allows fuel to bypass the regulator valve. When the compliant filter is installed it engages a portion of the valve which compresses the spring and therefore closes the fuel passage and directs the flow through the regulator valve. If a filter with these features is not used it cannot depress the valve, and thus will not allow fuel pressure regulation.

Another embodiment of the present invention relates generally to a spin-on filter (including, but not limited to, a metal spin-on filter, a composite spin-on filter, or spin-on filter made with other materials), a flow shut off valve (including, but not limited to, a drop down valve or a spring loaded valve) and a filter head. The spin-on filter has a protrusion that extends above the top surface of a gasket and is used to open the liquid flow path of the valve in the filter head. When a compliant filter including the protrusion feature is assembled to the filter head, the valve is pushed up and the flow path is opened. When a non-compliant filter is assembled with the head, the flow path remains closed (by flow force or by a spring depending on the valve used).

The term compliant filter is used herein at various times. It should be understood that the notion of a compliant filter as used herein does not refer to the elasticity of the apparatus. Instead, a compliant filter is a filter with a feature or features, such as a means for engaging, that when assembled with the filter head will result in an open flow path substantially through a valve in the head. That is to say, a non-compliant filter results in a blocked condition in which flow does not occur substantially through a valve in the head. Stated another way, in the absence of a compliant filter, no fluid (such as fuel) will flow substantially through a valve in the head.

With reference to FIGS. 1-4 there are illustrated various aspects of one embodiment of a valve of the present invention. The valve of FIGS. 1-4 is a flow interrupter valve intended for use in a filtration apparatus of an internal combustion engine.

Figure 2:
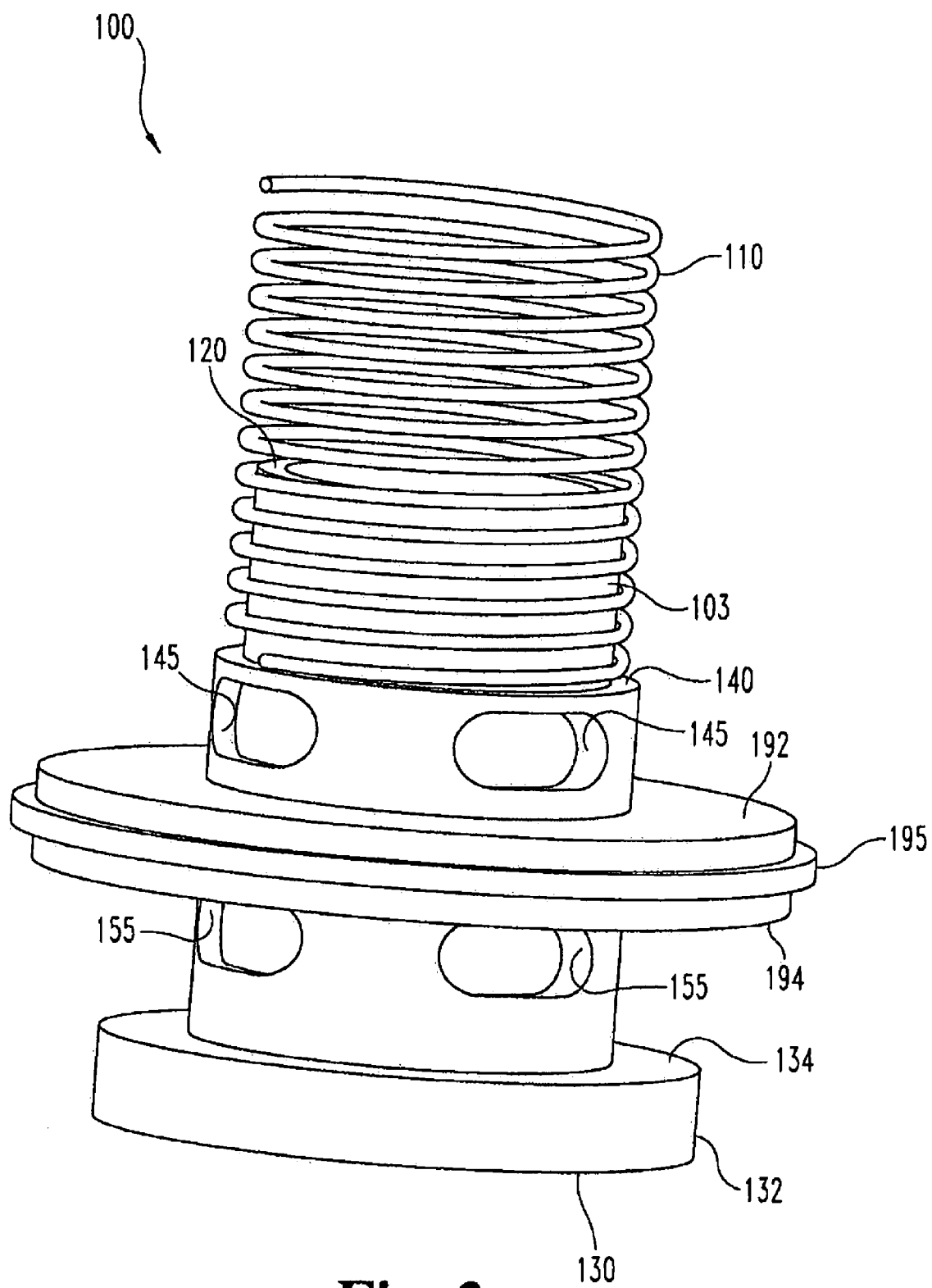
FIG. 2 is a side view of the embodiment of a fuel interrupter valve in the blocked condition.
Figure 3:
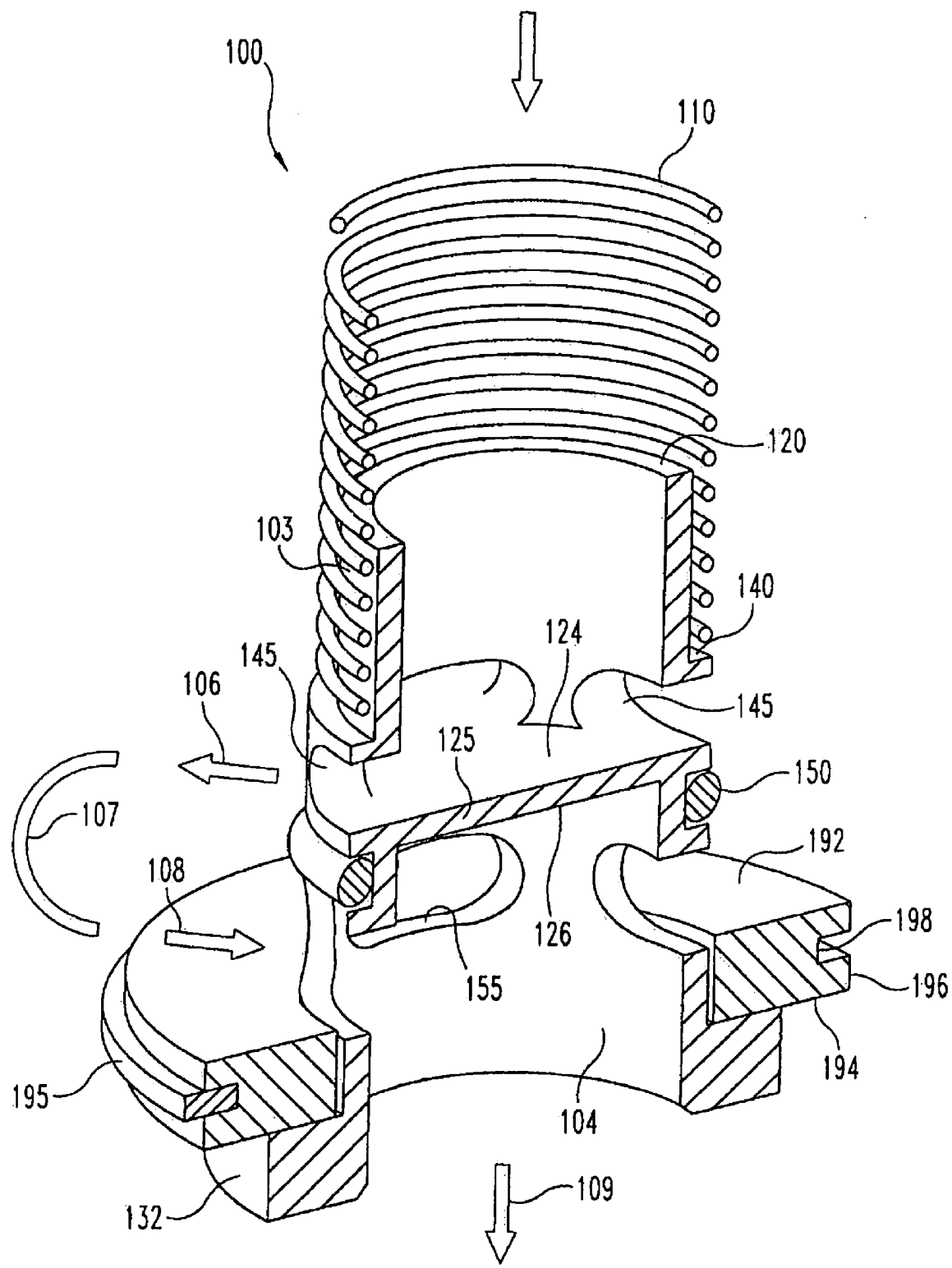
FIG. 3 is a cross-sectional view of the fuel interrupter valve of FIG. 1.
Figure 4:
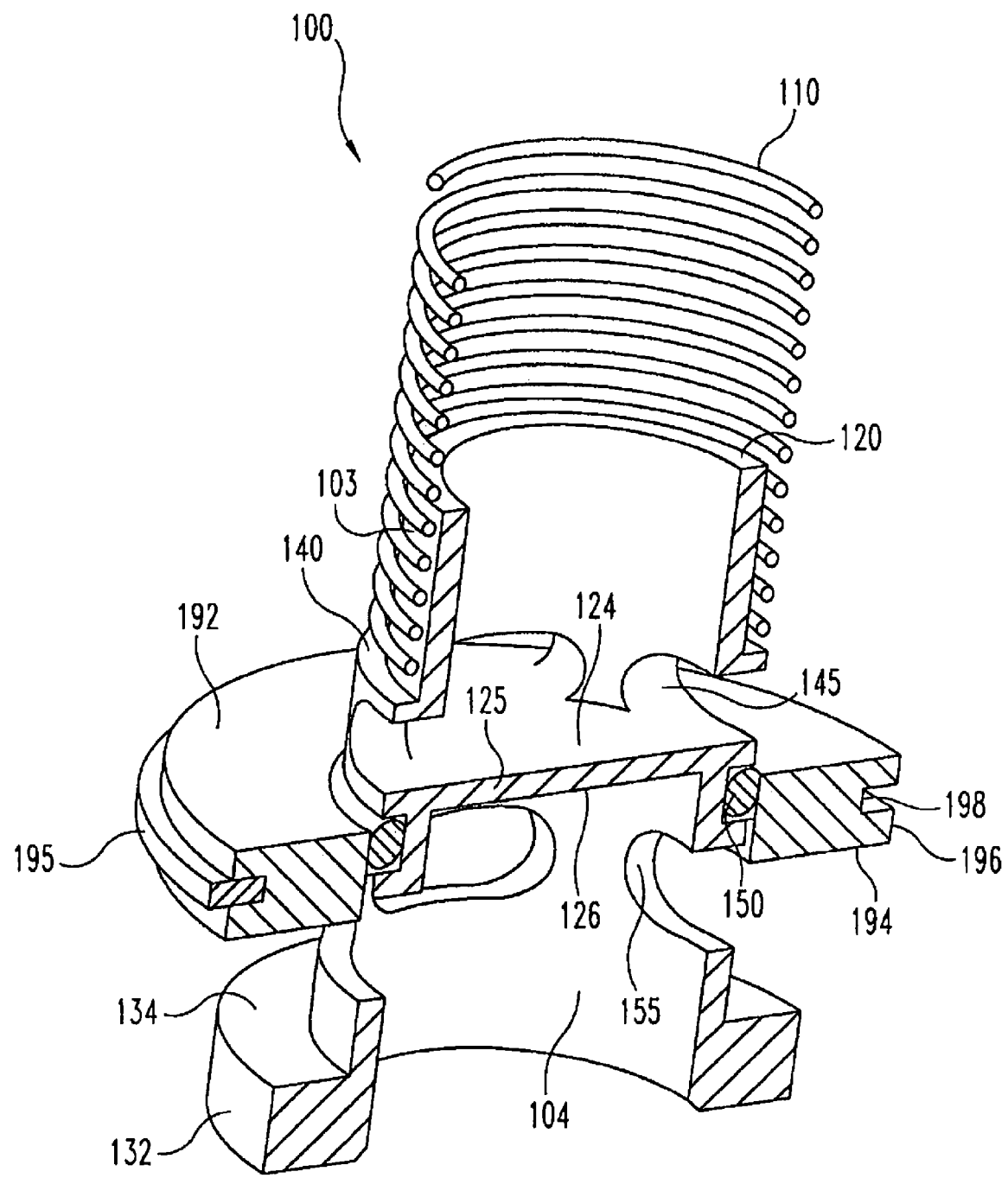
FIG. 4 is a cross-sectional view of the fuel interrupter valve of FIG. 2.

The flow interrupter valve 100 extends between a first end 120 and a second end 130. First end 120 will occasionally be referred to as top end 120, and second end 130 will occasionally be referred to as bottom end 130. FIGS. 1 and 3 illustrate the flow interrupter valve 100 in the run condition or first mode. Similarly, FIGS. 2 and 4 illustrate the flow interrupter valve 100 in the blocked condition or second mode. In the run condition, as illustrated by flow arrows 105, 106, 107, 108, and 109, fluid may enter the top end 120 of valve 100 and flow substantially within the interior of the valve 100 before exiting the second end 130 as indicated by the flow arrow 109. Flow interrupter valve 100 is preferably used in conjunction with the spring 110 that is retained within the filtration apparatus between a first land defined within an inlet of the filter head (not illustrated in FIGS. 1-4) and a second land 140 defined by a portion of the flow interrupter valve 100.

Between first end 120 and second end 130 the valve 100 has an exterior surface 103 and an interior surface 104. The interior surface 104 defines a first passage between the first end 120 and top surface 124 of internal fluid blocking barrier 125. The interior wall 104 defines a second passage between the bottom surface 126 of fluid blocking barrier 125 and the second end 130. Valve 100 includes a plurality of first openings 145 defined between the exterior surface 103 and interior surface 104. Similarly, valve 100 includes a second plurality of orifices between exterior wall 103 and interior wall 104. The first plurality of openings 145 is positioned between the first end 120 and internal blocking barrier 125. The second plurality of orifices 155 is positioned between the internal blocking barrier 125 and the second end 130. The valve 100 also preferably includes an external O-ring 150 that is positioned between the first plurality of openings 145 and the second plurality of orifices 155. As discussed in greater detail, below the external O-ring 150 acts as part of a flow path closing mechanism when the valve is in the second mode (also referred to herein as the blocked condition).

The second end 130 of valve 100 includes an annular portion 132 and a land 134. In the first mode of operation the valve 100 permits fluid to flow from the first end 120 to the second end 130 as indicated by the flow arrows 105-109. Fluid enters the first end 120 (arrow 105) and traverses the first passage defined by the interior surface 104 between the first end 120 and the internal blocking barrier 125. The flow then exits through the first plurality of openings 145 (as indicated by arrow 106). In the first mode of operation when the flow path is open (also referred to herein as the run condition) the bottom surface 194 of the retainer portion 190 of the valve is substantially adjacent to the land 134 of the bottom end 130. With the retainer portion 190 so positioned, the flow exiting the first plurality of openings 145 flows (as indicated by arrows 107 and 108) back into the interior of the valve 100 through the second plurality of orifices 155. Fluid then flows from the bottom surface 126 of the internal blocking barrier 125 through the second passage defined by interior surface 104 of valve 100 and exits the second end 130 (as indicated by arrow 109). Thus, in the first mode, the fluid flows substantially within the valve 100 between the first end 120 and the second end 130.

In one embodiment, valve 100 may include an impactor capability. As described above, in the run condition, flow proceeds down a central channel of valve 100, exits the central channel through opening 145, reenters the central channel through openings 155, and then continues down the central channel before exiting valve 100. To provide impactor capability flow may be accelerated when it leaves the central channel. Accelerated flow can impact a surface, such as a housing wall or a surface provided to facilitate impaction, after exiting openings 145. Impaction can remove particulate, such as solids or droplets, from the flow. There are a number of techniques which can provide flow acceleration suitable for impaction, for example, by increasing or decreasing the size of openings 145 and/or 155, by addition of a disc or other structure above o-ring 150, or by other techniques operable to provide accelerated flow. One embodiment utilizing impactor capability is a crank case ventilation impactor. Impactor capability can also be provided in other embodiments.

As previously mentioned, FIGS. 2 and 4 illustrate flow interrupter valve 100 in the second mode or state in which flow of a fluid entering first end 120 does not flow substantially within the interior of the valve 100 to exit through second end or bottom end 130. Instead, in the second mode or state, the retainer portion 190 (may translate relative to the exterior surface 103 of valve 100) is positioned adjacent to the external O-ring 150. Consequently, flow exiting the first plurality of openings 145 is prevented from reaching the second plurality of orifices 155 by a gate (in the form of top surface 192 of retainer 190 and O-ring 150). In the second mode or state the bottom surface 194 of retainer portion 190 of valve 100 is spaced apart from the land 134 at the bottom end 130 of the valve 100. The retainer portion 190 of valve 100 is fixed in place within a head, and it is the remainder of the valve that translates with respect to retainer 190. In particular, as illustrated in FIGS. 1-4, the retainer portion 190 includes an external circumferential surface 196 that defines a groove or recess 198. Positioned within the recess 198 is a snap ring 195 that is sized and shaped to lock into a corresponding recess within the head.

Figure 6:
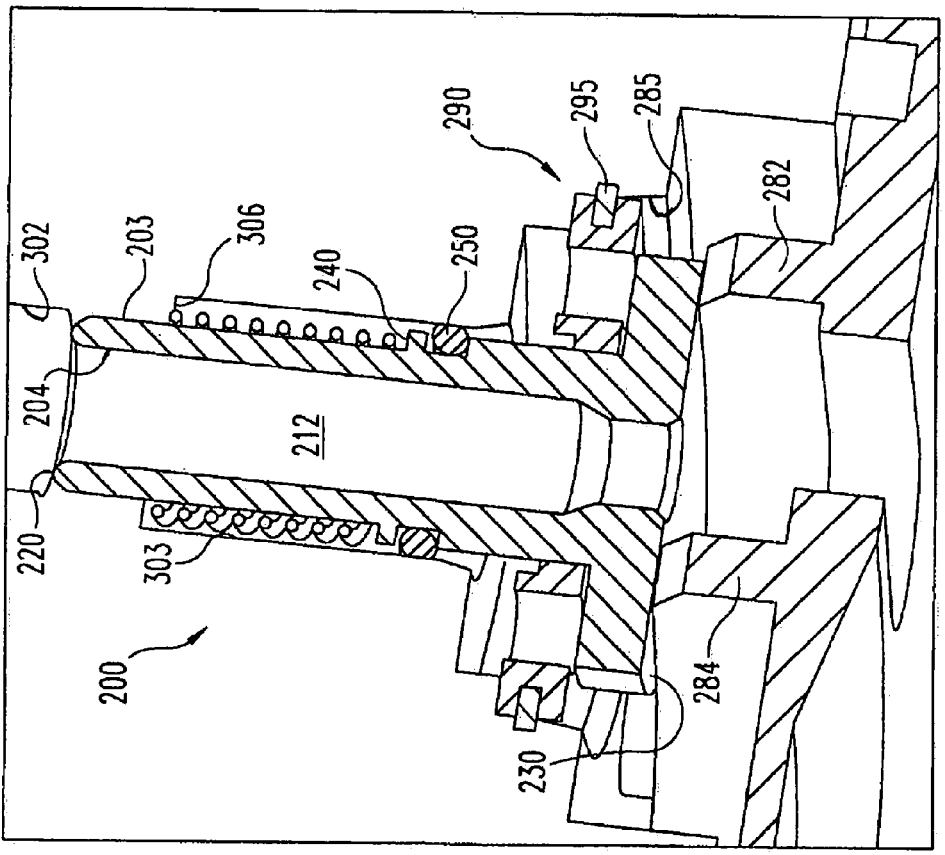
FIG. 6 is a side cross-sectional view of the installed fuel regulator valve of FIG. 5 with a compliant filter in position.
Figure 5:
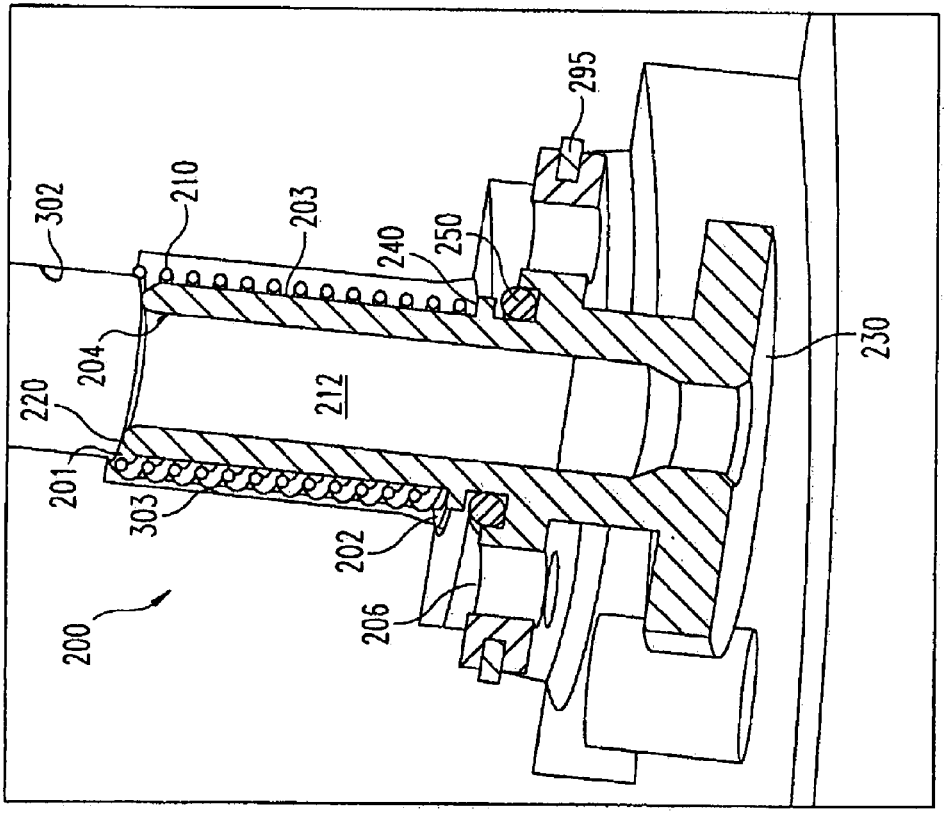
FIG. 5 is a side cross-sectional view of an embodiment of an installed fuel regulator valve in the absence of a compliant filter.

With reference to FIGS. 5 and 6 there is illustrated an embodiment of an installed valve in the absence of a compliant filter (FIG. 5) and in the presence of a compliant filter (FIG. 6). The valve 200 is a fuel regulator valve. Fuel regulator valve 200 extends between first end 220 and second end or bottom end 230. The valve 200 is at least partially positioned within an inlet conduit (not fully illustrated) of a filter head having a first conduit portion 302 and a second conduit portion 303. The differing diameters between first portion 302 and second portion 303 of the inlet conduit defines a first land 306 that engages a spring 210. Spring 210 extends between first land 306 defined by the inlet conduit of filter head 300 (see FIG. 9) and the second land 240 defined by a portion of the valve 200.

The components in the internal volume 212 of fuel regulator valve 200 are omitted in the FIGs. as unnecessary to an understanding of the present invention. When a compliant filter is installed, however, it engages the bottom end 230 of filter 200 and compresses the spring 210. When spring 210 is compressed fuel from the inlet conduit 302 of filter head 300 is forced to flow through the interior volume 212 of the fuel regulator valve 200. In the absence of the compliant filter the bottom end 230 is unseated from the retainer portion 290 of fuel regulator valve 200 by spring 210. Retainer portion 290 is similar to retainer portion 190 of fuel interrupter valve 100. Retainer portion 290 has a snap ring 295 that fits in a corresponding recess of the filter head 300 (see FIGS. 7 and 8 in the description below for further details).

As illustrated in FIG. 5, in the absence of an appropriate filter, regulator valve 200 is held in a normally open position by means of spring 210 that unseats the valve 200 and allows fuel or other fluids to bypass the regulator valve. As illustrated in FIG. 5, fuel or other fluid from inlet conduit 302 bypasses regular valve 200 at position 201 and flows around the exterior 203 of valve 200 and exits the second portion 303 of the inlet conduit at position 202. Fuel exiting from position 202 then bypasses the remainder of the valve by flowing through various openings 206.

With reference to FIG. 6 there is illustrated a fuel regulator valve with a compliant filter installed having means for engaging (282, 284) the bottom end 230 of valve 200. The means for engaging illustrated in FIG. 6 are radial ribs 282 and 284 of, for example, a spin-on filter or filter cartridge (not illustrated). With the compliant filter installed the ribs 282 and 284 engage the bottom end 230 of the valve 200, thus depressing the valve. This compresses the spring 210 while translating the top end 220 further into the inlet conduit of the filter head 300. As a result external O-ring 250 engages the second portion 303 of the inlet conduit in a sealing engagement. The sealing engagement of external O-ring 250 with second portion 303 of the inlet conduit prevents fluid from bypassing the interior volume 212 of fuel regulator valve 200. Thus, with the installation of a compliant filter, the spring 210 is compressed and the bypass flow path is closed off, thus directing flow through the regulator valve 200.

Figure 8:
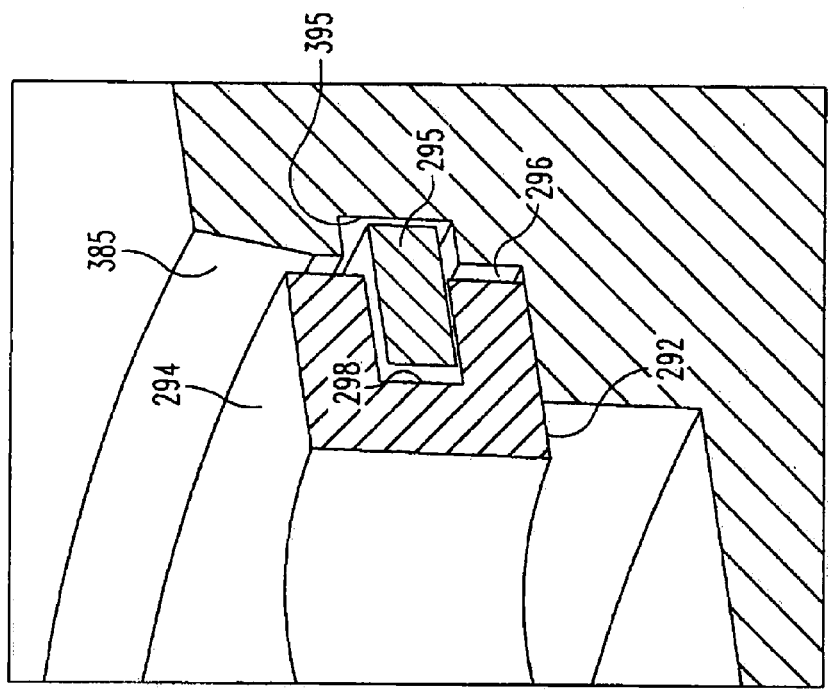
FIG. 8 is an enlarged side cross-sectional view of a portion of FIG. 7.
Figure 7:
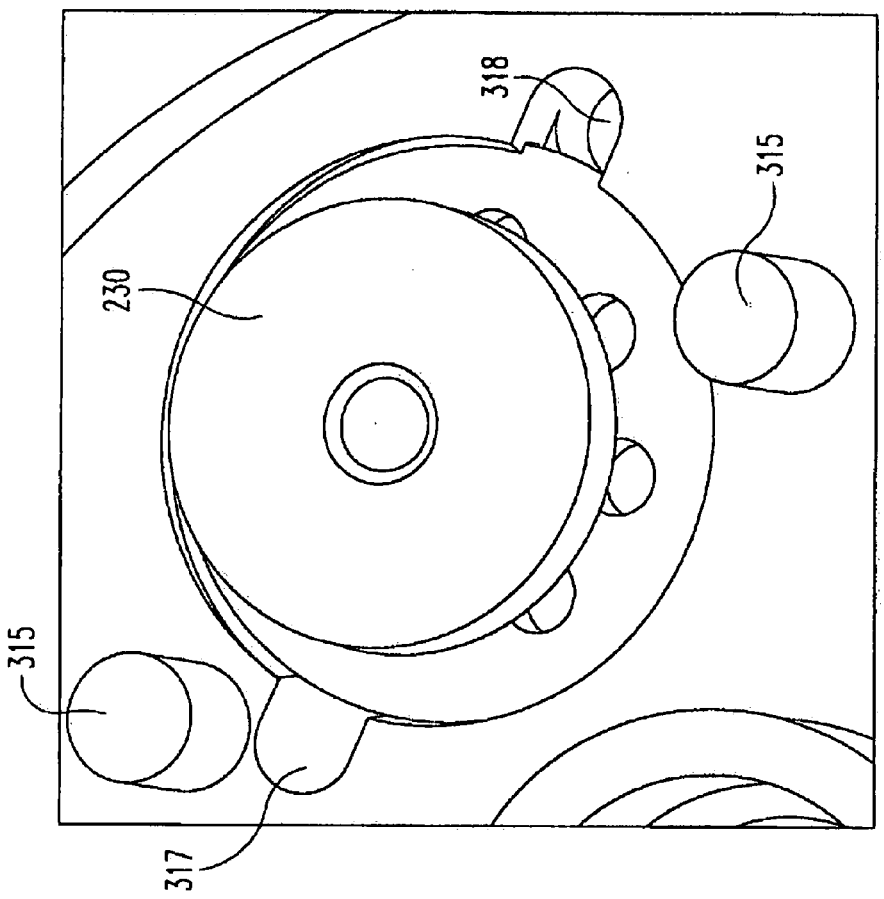
FIG. 7 is a bottom perspective view of an embodiment of a valve installed into the filter head.

With reference to FIGS. 7-8 there are illustrated further details of the installation of an embodiment of a valve of the present invention in a filter head. While the description and reference numerals used in FIGS. 7 and 8 conform to those of a regulator valve 200, it should be understood that it is contemplated that is within the scope of the invention that the description of FIGS. 7 and 8 is equally applicable to the interrupter valve 100 with its retainer portion 190. The retainer portion 290 has a bottom surface 292 and a top surface 294. Retainer portion 290 also includes an annular portion 296 that defines a recess 298 therein. Snap ring 295 engages recess 298 of retainer 290 of valve 200.

As illustrated in FIGS. 7 and 8, snap ring 295 is pressed into an opening of the filter head 300 until it engages a corresponding recess 395. The opening in filter head 300 preferably includes an angled surface 385 for ease of installation of the retainer portion 290 of valve 200. Retainer portion 290 of valve 200 retains the valve 200 within the filter head 200 by means of a snap ring 295 locking into the corresponding recess 395 of the filter head. It should be understood that the regulator valve 200 (or the interrupter valve 100) can be removed if necessary by means of two pins that can be inserted into holes 317 and 318 that will compress the snap ring 295 and allow the valve 200 to be removed. The valve 200 is preferably installed into the filter head 300 by first putting the spring 210 into the inlet conduit and then putting the valve 200 in place.

As previously noted, one desirable outcome of various embodiments of the present invention is to prevent the use of substitute filter components of lesser and/or inferior quality. To accomplish that outcome, the filter head 300 preferably includes one or more stand-off pins 315. Stand-off pins 315 assist in preventing the use of noncompliant filters. Thus, the means for engaging the bottom end 230 of valve 200 is preferably also designed to avoid stand-off pins 315. While the stand-off pins 315 have the potential to increase difficulty of installation of fuel regulator valve 200, the use of a lead-in angle as defined by angled surface 385 will preferably permit push-in installation of the valve 200.

Figure 9:
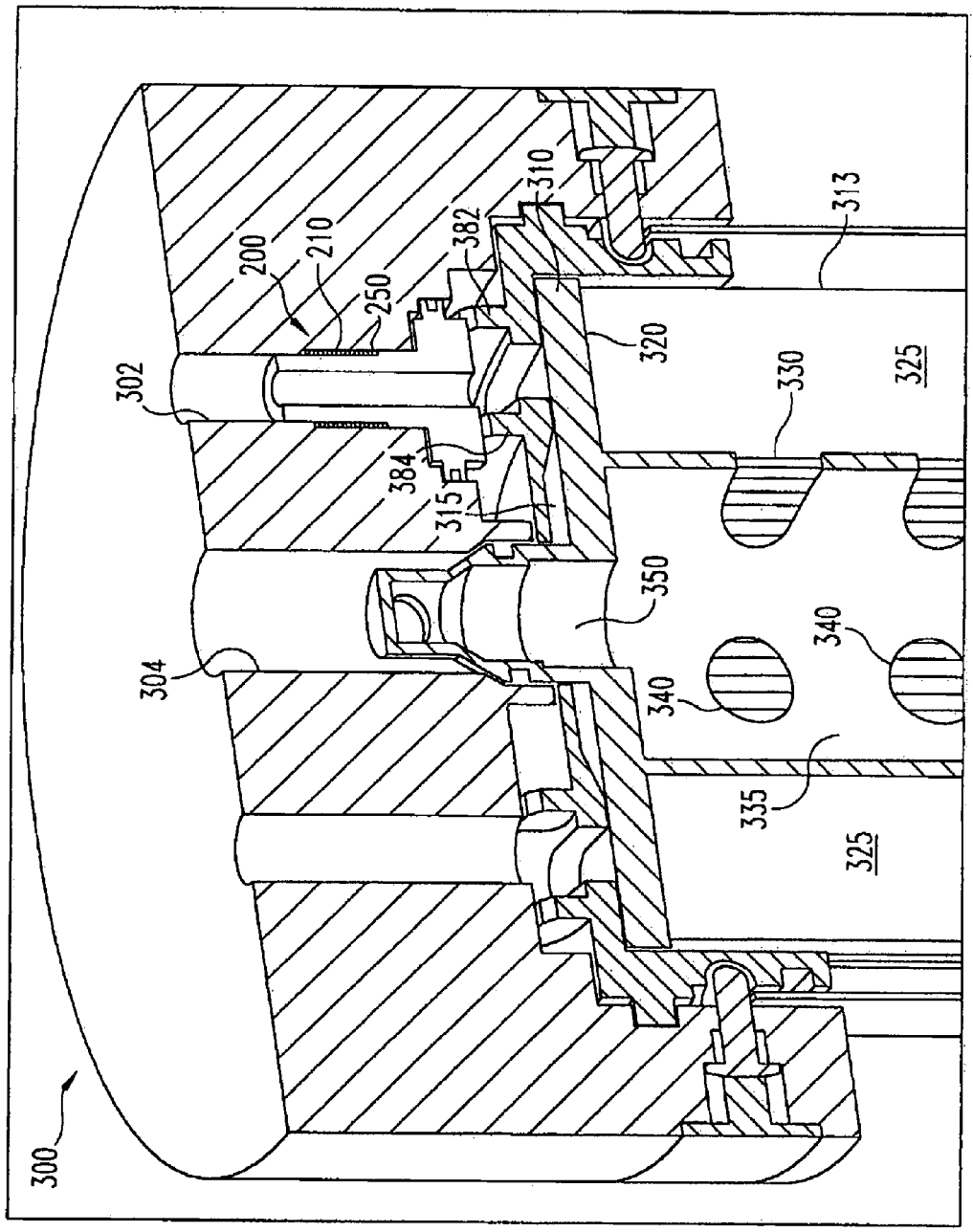
FIG. 9 is a side cross-sectional view of a valve of the present invention in conjunction with a compliant filter installed in the filter head.

With reference to FIG. 9 there is illustrated a filter head 300 assembled with valve 200 and a filter or filter cartridge from the present invention. As previously discussed, filter head 300 includes an inlet port 302 and a preferably centrally located outlet port 304. The valve 200 is shown in the first mode in which the spring 210 is compressed between the land 306 of the filter head and the land 240 of the valve 200. Thus, the external O-ring 250 sealingly engages the internal surface 303 of inlet conduit 302. The valve 200 is depressed from the second (bypass) mode into the first mode by means for engaging (382, 384) the bottom end 230 of the valve 200. The means for engaging are present on the head end 310 of the filter. In particular the head end 310 (including, but not limited to, an end plate 310) extends between the top surface 315 and the bottom surface 320. Top surface 315 preferably defines means for engaging the bottom end 230 of valve 200. As illustrated in FIG. 9, the means for engaging may comprise a first axially upwardly extending rib 384 at a first radial position. The means for engaging preferably, but not necessarily, further comprises a second axially extending rib 382 at a second radius. The second rib 382 being at a second radius greater than the first radius of the first rib 384.

It should be understood that it is contemplated as within the scope of the invention that the valve 200 may be replaced by a flow interrupter valve 100 or other valves known to those skilled in the art including those discussed herein below (such as a drop down valve closed by flow forces instead of a spring). Similarly the means for engaging is not limited to a pair of axially extending members from the top surface 315 of the end plate 310. Any protruding member sufficient to depress the bottom end 230 of valve 200 and shift it from a second state to a first state is contemplated as within the scope of the invention. The means for engaging may be a single circumferential rib or a pair of circumferential ribs. Such means for engaging are preferably conformed to avoid any protection against usage of substandard filters present on the head, such as previously discussed stand-off pins 315. The means for engaging might be a single circular ring extending substantially axially away from the top surface of the head end. The ring may be continuous or may include discontinuities as is the case for the embodiment illustrated in FIG. 11. Alternatively, the means for engaging may be plurality of finger members (see FIG. 20) protruding from the top surface 315 of the head end 310 of the filter or filter cartridge. The filter cartridge is made up of a head end or endplate 310 connected or positioned within a canister defined by a wall 313.

As illustrated in FIG. 9, fluid flows through the inlet 302 of the filter head 300. The fluid then flows through the valve 200 since, as illustrated in FIG. 9, the means for engaging 382, 384 depresses the bottom end 230 of the valve 200 so that the valve is in the first state. After passing through the valve 200, fluid enters the interior cavity 325 of the filter cartridge through various inlets (not illustrated). To reach the outlet port 350 of the filter cartridge and pass on to the outlet port 304 of the filter head 300 the fluid must pass through a preferably annular filtration media 330 positioned within cavity 325. The fluid passes through the annular filtration media 330 into a central column 335 via a plurality of openings 340 defined in the central column. Fluid then flows out through the port 350 and on into the outlet conduit 304 of filter head 300.

Figure 10:
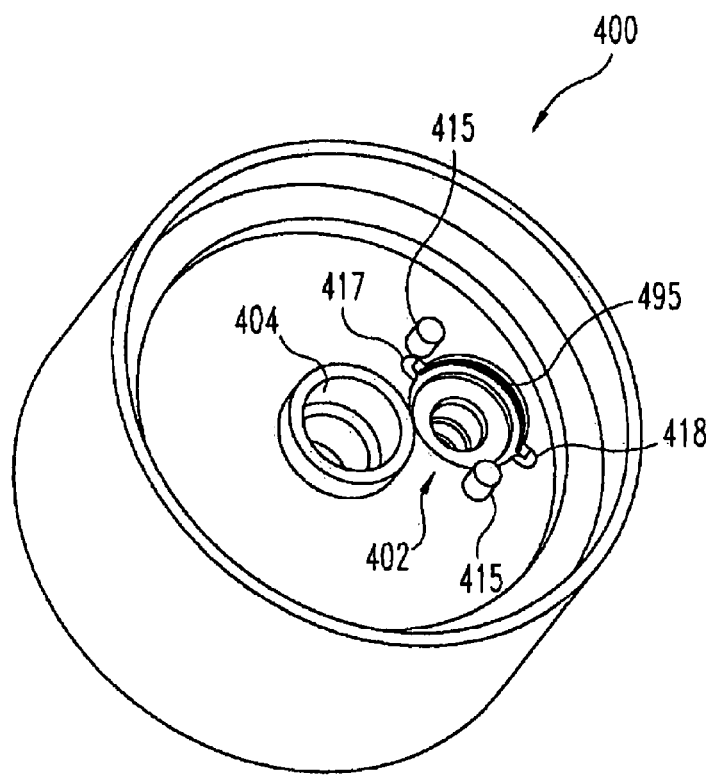
FIG. 10 is a bottom perspective view of a filter head of one embodiment of the present invention.

With reference to FIG. 10 as illustrated another embodiment of a filter head 400 of the present invention. Filter head 400 includes an inlet bore 402 and a preferably central outlet bore 404. Substantially adjacent to inlet 402 are a pair of stand-off pins 415. Inlet 402 further defines an internal recess 495 for receiving a snap ring such as snap ring 295 or snap ring 195 of valves 200 and 100, respectively. The filter head 400 preferably includes openings 417 and 418 adjacent to the recess 495 in inlet bore 402. The openings 417, 418 permit the valve to be removed if necessary by using two pins or other members that can be inserted into holes 417, 418 that will compress the snap ring (such as snap ring 195, 295) and allow the valve 100, 200 to be removed.

Figure 11:
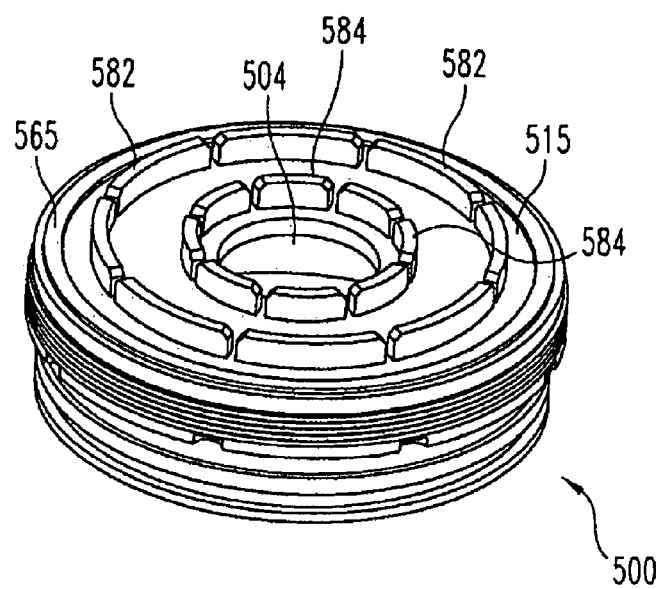
FIG. 11 is a top perspective view of a head end of one embodiment of the filter of the present invention.

With reference to FIG. 11 there is illustrated one embodiment of an end plate or head end for use with an embodiment of the filtration apparatus of the present invention. Head end 500 includes a top surface 515 extending around a substantially centrally located outlet port 504 defined therein. The top surface 515 defines one or more protrusion members. In the example illustrated in FIG. 11, the means for engaging 584 comprises a plurality of axially extending circumferentially located members 584 at a first radius. As discussed above, the means for engaging may be a discontinuous plurality of circumferentially located members 584 at a first radius. Similarly, the means for engaging the bottom end of the valve preferably further comprises (or may comprise in isolation) a plurality of axially extending circumferentially positioned members 582 at a second radius. The second radius being larger than the first radius.

Figure 12:
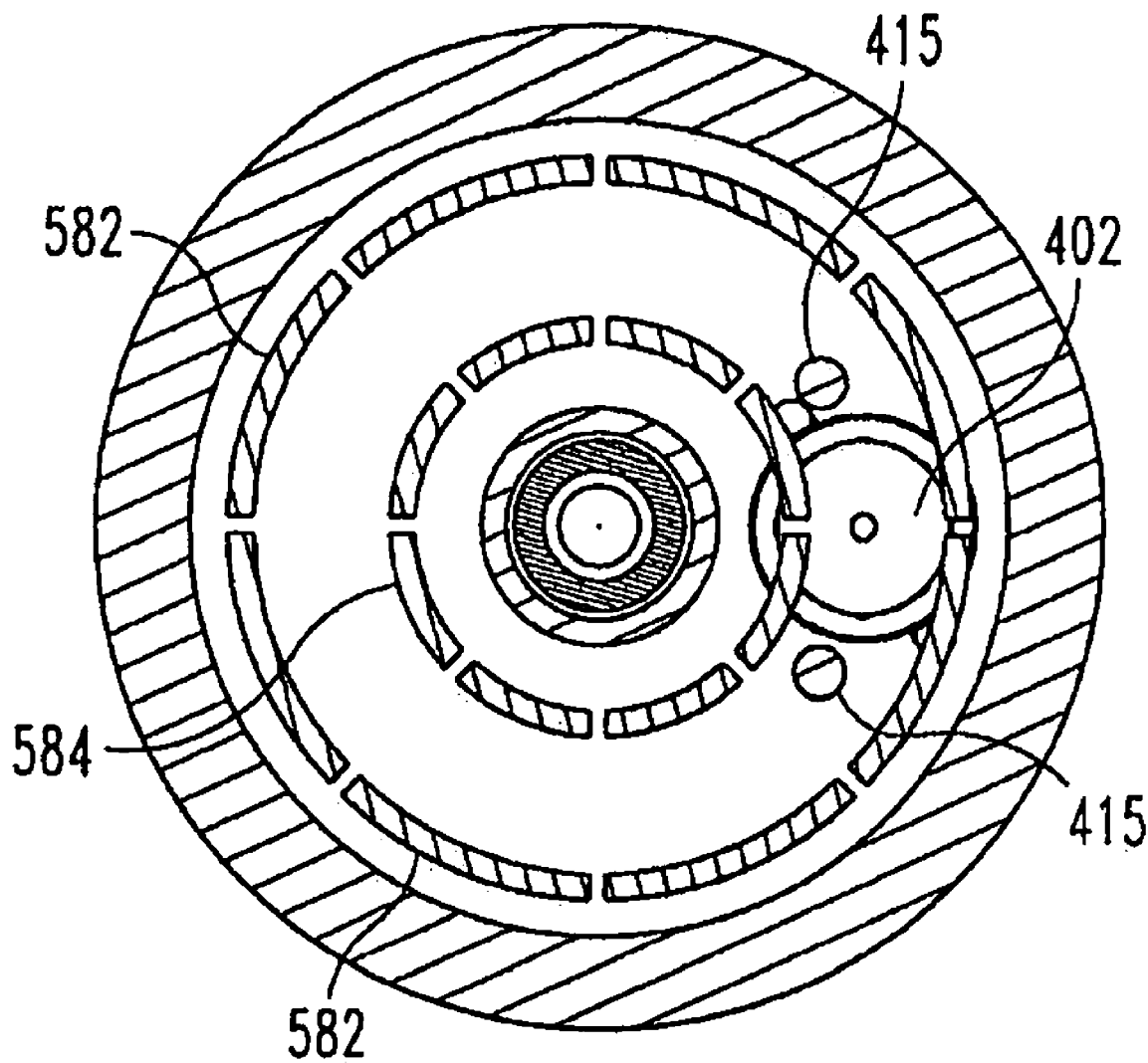
FIG. 12 is a bottom view further illustrating details of the interface between the filter head of FIG. 10 with the endplate of FIG. 11.

With reference to FIG. 12 there are illustrated details of the interface between the head end 500 and the head 400. In particular, the axially extending members 584 at a first radius will overlap the inlet port 402 of the filter head (and consequently overlap the bottom end 230, 130 of valves 200, 100 respectively) without substantial interference from the stand-off pins 415 of head 400. Similarly the axially extending members 582 at a second radius also overlap the inlet 402 of the filter head 400, and thus would also depress the bottom end (130, 230) of a valve (100, 200) positioned within the inlet 402.

Figure 14:
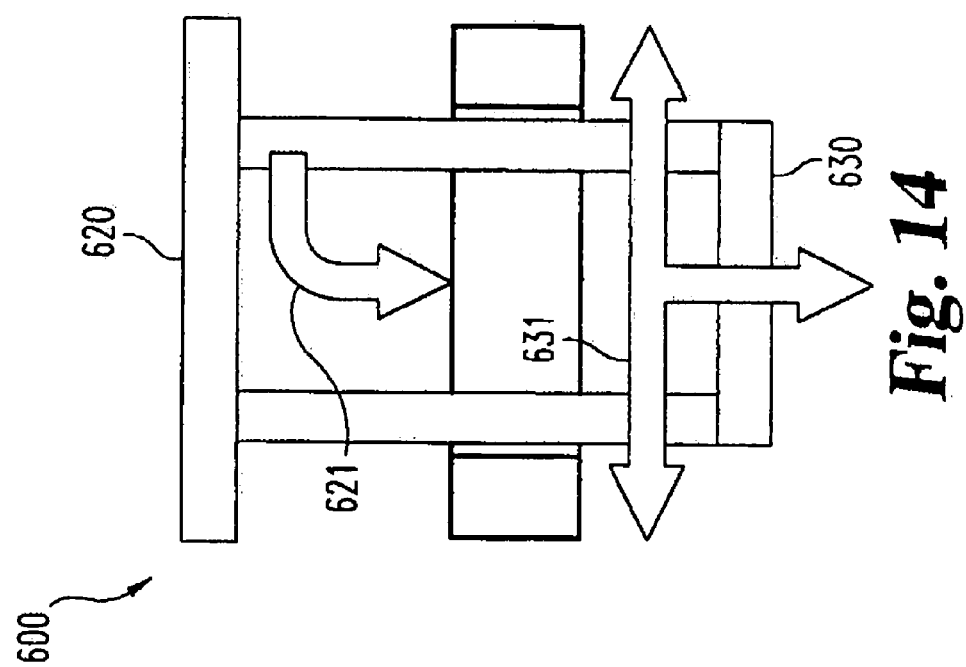
FIG. 14 is a side illustrative view of a drop down valve of the present invention in the presence of a compliant filter with the flow path open.
Figure 13:
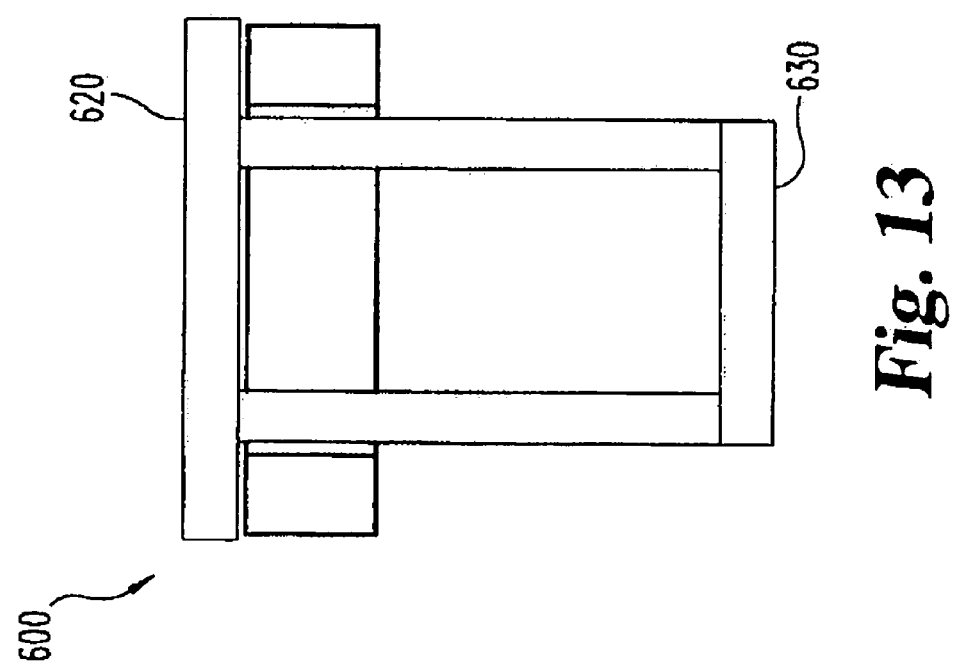
FIG. 13 is a side illustrative view of a drop down valve of the present invention in the absence of a compliant filter with the flow path closed.

With reference to FIGS. 13 and 14 there is illustrated an embodiment of a drop down valve for use with the present invention. With reference to FIG. 13 there is illustrated drop down valve 600 extending between a top end 620 and a bottom end 630. The drop down valve 600 illustrated in FIG. 13 is in a second state in which a drop down valve is generically illustrated in a mode absent the installation of a compliant filter. Thus, the drop down valve 600 will be pushed/sucked to close the flow path. In FIG. 14 a compliant filter is installed, and thus a protrusion on the filter will engage the bottom end 630 to push the valve 600 up to open the flow path (indicated by the arrows 621 and 631). When the protrusion on the filter (not illustrated in FIGS. 13 and 14) pushes the valve 600 up to open the flow path, various windows are created from the inlet conduit 602 of head 640 so that a fluid may flow from the inlet conduit 602 through windows in the valve 600 to flow from the top end 620 through the valve 600 and out additional windows at the bottom end 630 as indicated by the arrows 631.

Figure 15:
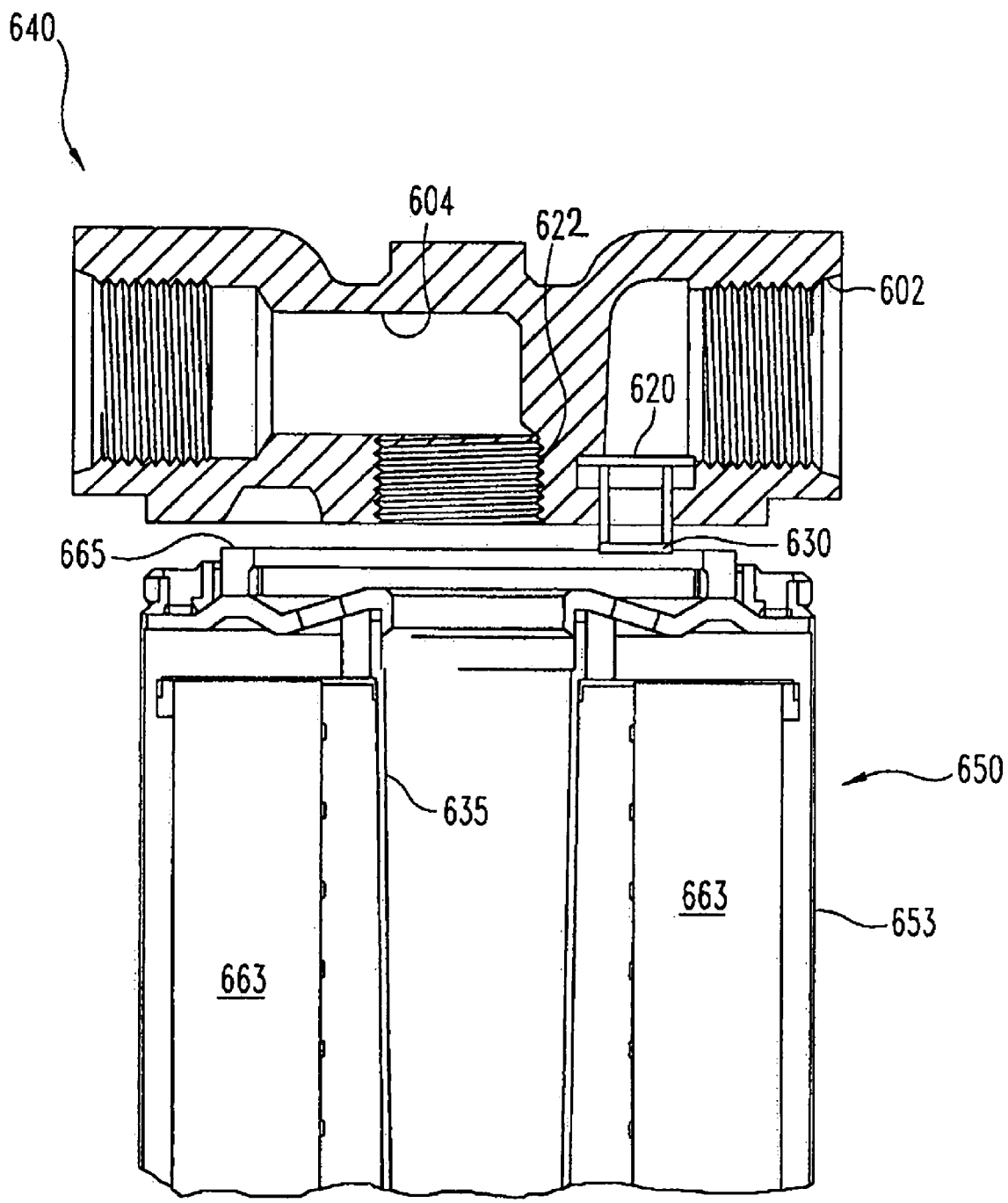
FIG. 15 is a side cross-sectional view of a drop down valve of the present invention in the absence of a compliant filter installed in the filter head.

With reference to FIG. 15 there is illustrated a drop down valve 600 in conjunction with the head 640 in the absence of a compliant filter. The filter head 640 has an inlet conduit 602 and an outlet conduit 604. The filter head 640 is connected to an outlet of the filter 650 via threading 622 on the head 640. The filter 650 has a wall 653 that defines an interior cavity in which a filter media 663 is present. Fluid entering the inlet(s) of the filter 650 must pass through the filter media 663 to reach the central column 635 that is fluidly connected to the outlet bore 604. It should be understood the top surface 665 of the filter 650 lacks any means for engaging the bottom end 630 of the valve 600. Thus, in the absence of a compliant filter, the valve 600 is closed by flow forces. It should be understood that it is contemplated as within the scope of the invention that valves other than drop down valve 600 that is closed by flow could be used. For example, the spring loaded valves 100, 200 previously discussed might instead be used. Consequently, the filter 650 when assembled to the filter head 640 is in a blocked or no-run condition, and has a closed fluid flow path.

Figure 16:
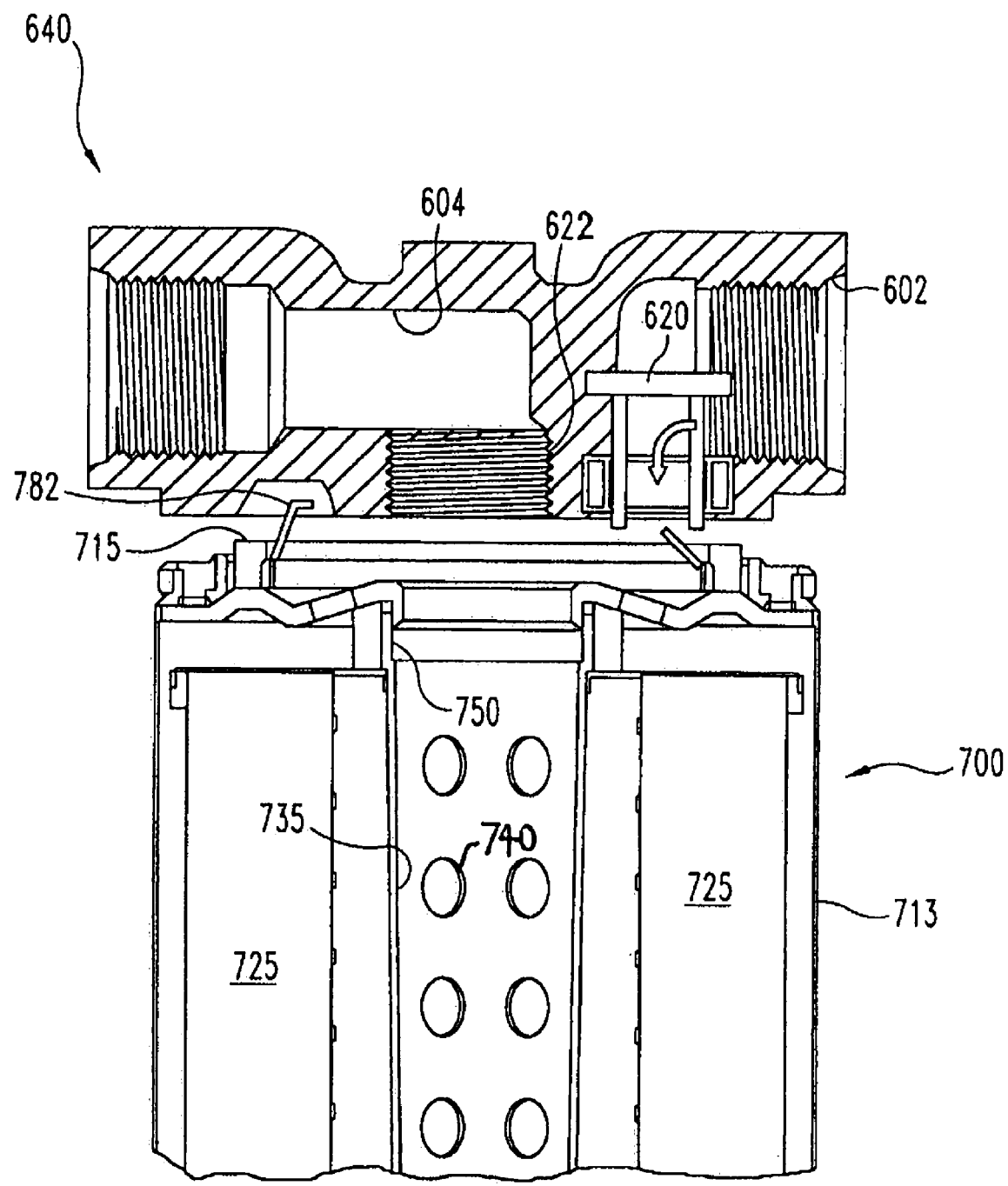
FIG. 16 is a side cross-sectional view of a drop down valve of the present invention in conjunction with a compliant filter installed in the filter head.

Referring now to FIG. 16 there is illustrated the use of a drop down valve 600 in conjunction with a filter head 640 assembled to a compliant filter 700. Like elements are labeled as previously with the same reference numerals. The compliant filter 700 has an outer wall 713 that defines an interior cavity in which is positioned a preferably annular filtration media 725. As illustrated in FIG. 16 the compliant filter 700 includes a top surface 715 that has means for engaging 782 the bottom end of the valve 630. The means for engaging 782 is a protrusion feature as illustrated in, for example, FIG. 19. It should be understood that it is contemplated as within the scope of the invention that the means for engaging 782 may instead be a plurality of arms or members (such as arms or members 884 of FIG. 20). The means for engaging 782 contacts the bottom end 630 of valve 600. Thus, the valve 600 is opened by the protrusion 782, permitting flow from the inlet port 602 of the filter head 640 to reach the filter 700.

Filter 700 is preferably a spin-on filter. As illustrated in FIG. 19 the top surface 715 of the filter 700 includes a plurality of inlet openings 722. The inlet openings 722 receive fluid flowing through the inlet port 602 that will flow through the interior of the drop down valve 600 into the inlet opening(s) 722 on the top surface 715 of filter 700. The fluid then must flow through the annular filtration media 725 into central column 735 via a plurality of openings 740. Fluid then flows out through outlet opening 750 in the top surface 715 of the filter 700. A portion of the outlet opening 750 preferably includes internal threading matching external threading 622 (see FIG. 18) on central portion of head 640. After passing through outlet 750, fluid enters the outlet port 604 of head 640 and flows to the engine (for example, fuel flowing to the combustion chamber).

Figure 17:
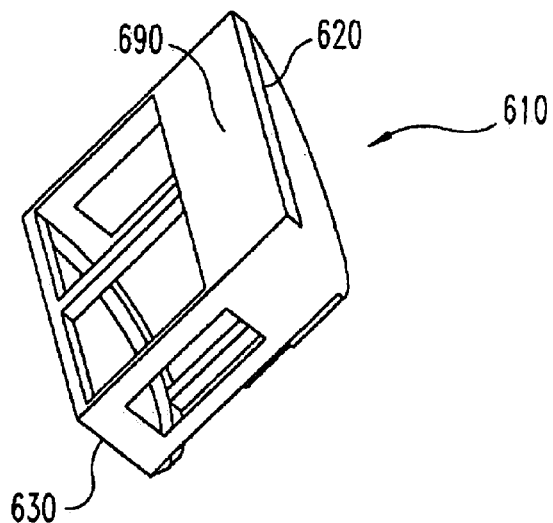
FIG. 17 is a side perspective view of an embodiment of a drop down valve of the present invention.

With reference to FIG. 17 there is illustrated a more specific embodiment of the drop down valve 600 extending between top end 620 and bottom end 630. In particular the drop down valve 610 includes a retainer portion 690 intended to permit easy installation and to secure the shut-off valve 610 inside of the filter head 640 via a slot 695 (see FIG. 18) formed in head 640.

Figure 18:
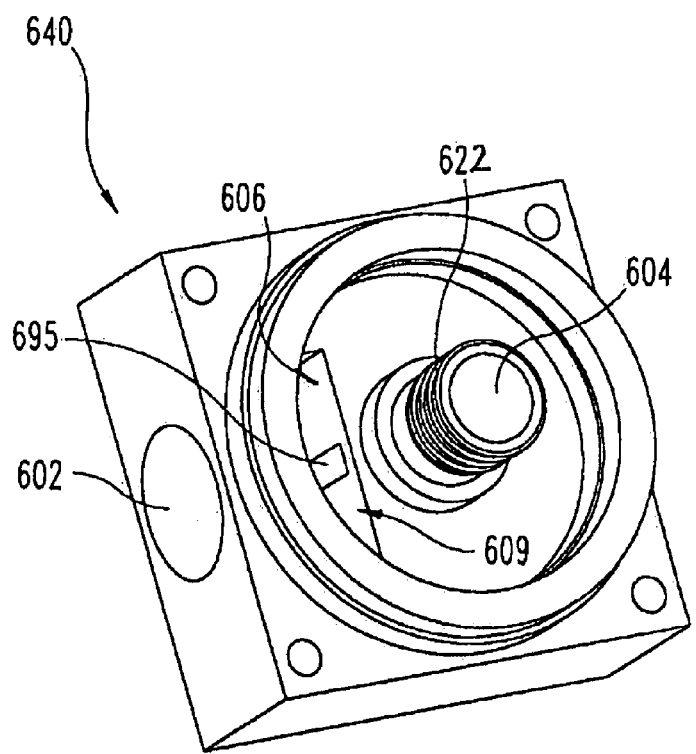
FIG. 18 is a bottom perspective view of an embodiment of a filter head of the present invention intended for use with the drop down valve of FIG. 17.
Figure 19:
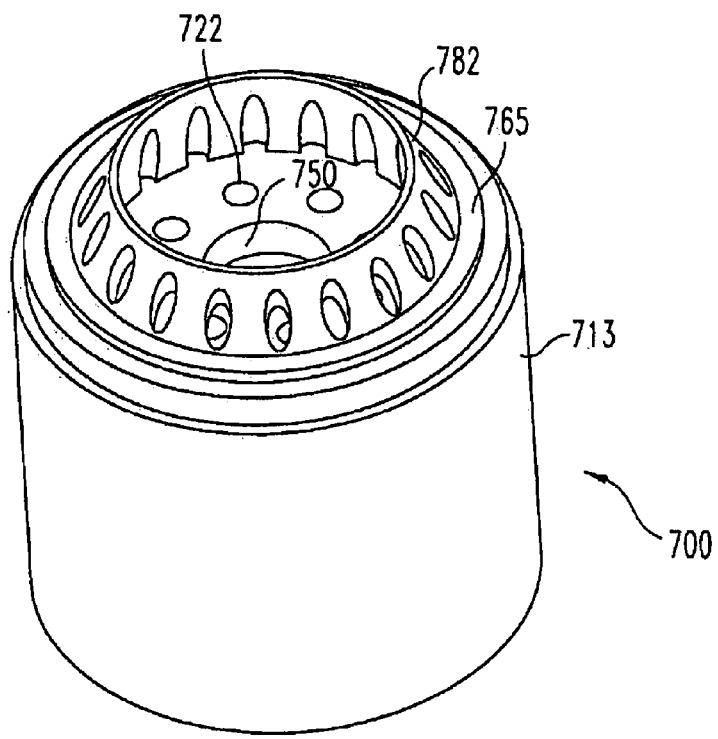
FIG. 19 is a top perspective view of an embodiment of a spin on filter with a protrusion at the top.

Further details of the head 640 are illustrated in FIG. 18 with like elements labeled with reference numerals as previously discussed. The head 640 has an inlet 602 that is fluidly connected to the valve 610 that is at least partially positioned therein. The head 640 has a slot 695 corresponding to the retainer portion 690 of valve 610. Valve 610 has a retainer portion 690 that engages the slot 695 in the surface 606 of head 640. Head 640 preferably includes threading 622 for connecting to outlet 750 of filter 700.

With reference to FIG. 19 there are illustrated further details of a spin-on filter 700. As illustrated in FIG. 19, the spin-on filter 700 includes a protrusion feature 782 extending around a circumferential portion of the top surface 715 that includes a plurality of inlet openings 722 and an outlet opening 750. The external protrusion feature 782 extends axially upward above the top surface of gasket 765.

Figure 20:
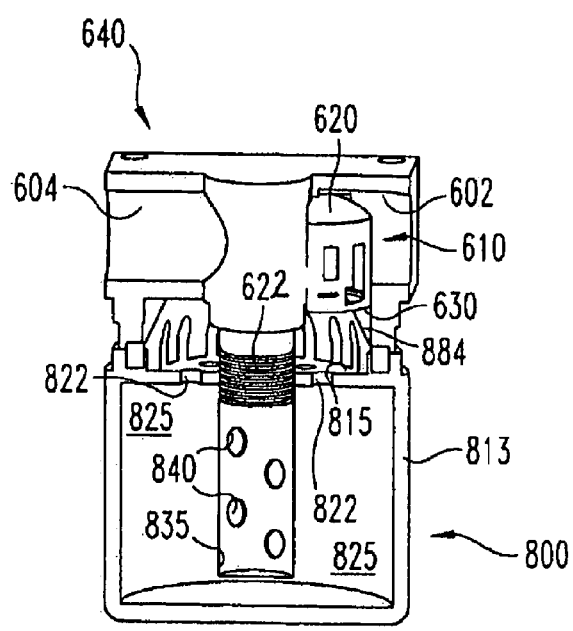
FIG. 20 is a side cross-sectional view of a drop down valve of the present invention in conjunction with a compliant filter installed in the filter head.

With reference to FIG. 20 there is illustrated the drop down valve 610 in conjunction with the head 640 and a different embodiment of a spin-on filter 800. Like elements are again labeled with the reference numerals as previously discussed. Head 640 includes an inlet 602 and an outlet 604. The filter head 640 also preferably includes threading 622 for engaging similar threading on the spin-on filter 800. The valve 610 extends between a top end 620 and a bottom end 630 and is assembled at the intersection of the filter head 640 inlet 602 and the hollow ring in the filter 800. The filter 800 includes a plurality of inlet openings 822 defined in the top surface 815. Top surface 815 also defines a outlet opening (not illustrated) that is connected to the outlet port 604 of the filter head 640. A wall 813 of the spin-on filter 800 defines an interior cavity therein in which is preferably positioned an annular filtration media 825. Thus, fluid flows in the inlet port 602 of the filter head 640 and through the drop down valve 610 then flows through inlet openings 822 of the spin-on filter 800. The fluid then must flow through the filtration media 825 into the central column 835 via a plurality of openings 840 defined by the central column 835. The fluid then flows out the outlet 604 of the filter head 640. As illustrated in FIG. 20 the drop down valve 610 has been shifted from a second (closed) state to a first (open) state via at least one of the plurality of arms or members 884 extending axially upward from the top surface 815 of spin-on filter 800.

As should be appreciated from the above description, when the valve 100 is installed into the head it will not allow fuel flow to the engine if the correct filter is not installed. Without the correct filter in place the valve is held in a normally closed position by means of the spring that closes the fuel passage. When the correct filter is installed it compresses the spring and therefore opens the fuel passage. Features such as a stand off pin are preferably present in the head that block installation unless a compliant filter is used. As previously noted, it should be understood that the spring is preferably not integral or attached to the valve (but could be), but is instead retained between the two lands (one on the valve and one on the head). The portion of the filter's head end with protrusions to engage the bottom end of the valve and press it up against the spring is preferably a plurality of radial ribs. One rib is sufficient, and could be either the radially inner or radially outer (or something between those two radii that engages the bottom end of the valve without substantial interference from any standoff pin(s).

As should be appreciated from the above description, with respect to the regulator valve 200, the valve is preferably used in the line from the fuel tank. Such a regulator valve 200 is useful because at times in the engine an overpressure situation arises and it is preferable to return fuel to the fuel to tank. It will of course be understood that in some respects the spring 210 holds valve 200 open instead of preventing flow. When the valve 210 is unseated by the spring 210, fuel bypasses the regulator valve.

It should be understood that various embodiments of the present invention might also find application to other fluids, such as oil rather than fuel. It should be further understood that various embodiments of the present invention contemplate the use of a spin-on filter that has a feature or features protruding above a gasket top surface. For example, for a metallic spin-on filter the protrusion might be an extension of retainer ring, or an added ring. It should further be understood that the protrusion could be a continuous ring, a ring with discontinuities (such as a plurality of arcuate members), finger or arm members, or other shapes. As another example, for a composite filter one preferred protrusion is an external rib shape. The protrusion feature is used to open the liquid flow path of a valve in the filter head. In one embodiment such a valve preferably comprises a permanently mounted retainer and a shut off valve (or other type valve in which the flow path can be shut off). The retainer is preferably permanently mounted to the inlet of the head. The filter and head design of the present invention preferably makes the filter integrate with the head, and thus prevents or minimizes the use of substandard and/or incorrect filters.

It should be understood that as used herein the term substantially adjacent to an end contemplates as within the scope of the invention that something might be the end, immediately next to the end, or might be slightly spaced apart from the end.

It should be understood that it connections other than threaded connections are contemplated as within the scope of the invention between, for example, the filter and the head. For example, the connection could be a quarter turn or bayonet style connection.

There are many applications for the filter and/or filter assembly of the present invention. For example, the filter assembly can be used for other farm equipment, construction equipment, skidders, loaders, other off-road vehicles, heavy-duty highway trucks, automobiles, and other vehicles, industrial machines requiring hydraulic filtering, and all other equipment or mechanical devices that require the filtering of fluids. Additionally, the filter assembly can be used to remove foreign matter from a variety of different fluids. Examples of liquid fluids include other hydraulic fluids, engine lubrication oil, diesel fuel, gasoline, engine coolant, automatic transmission fluid, and any other type of fluid. The filter assembly can also be used with gaseous fluids such as air and exhaust.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language at least a portion" and/or "a portion" is used the item can include a portion and/or the entire item unless specifically stated to the contrary.

What is claimed is:

1. A filter for use in a filtration assembly, the filtration assembly including a head having at least one stand-off pin, the filter comprising:
   a canister open on a first end, the canister having a wall defining an interior cavity;
   an endplate having a top end and a bottom end, the endplate having an inlet and an outlet both extending between the top end and the bottom end, the endplate being connected to the first end of the canister;
   wherein the endplate inlet is fluidly connected to the endplate outlet through a filter media positioned within the interior cavity; and
   wherein the top end of the endplate includes a first externally protruding rib substantially spanning a circumferential portion of the top end of the endplate that projects upwardly therefrom such that the first externally protruding rib does not overlap the stand-off pin when the filter is connected to the head, and wherein a top contact surface of the first externally protruding rib is equidistant from the top end of the endplate at all points;
   a second externally protruding rib substantially spanning a circumferential portion of the top end of the endplate, wherein the first externally protruding rib is at a first radius, and the second externally protruding rib is at a second radius that is larger than the first radius; and
   the second externally protruding rib projects upwardly from the top end of the endplate such that the second externally protruding rib does not overlap the stand-off pin when the filter is connected to the head, wherein a top contact surface of the second externally protruding rib is equidistant from the top end of the endplate at all points.

2. The filter of claim 1, wherein the filter includes a substantially annular filter media surrounding a central column that is fluidly connected to the endplate outlet, the column including a plurality of openings, the endplate outlet being fluidly connected to the endplate inlet through the plurality of openings and through the filter media.

3. The filter of claim 1, wherein the filter is connectable to the head by threading, and wherein the first and second externally protruding ribs both engage a bottom end of a valve positioned within the head to shift the valve from a non-flow mode to a flow mode when the filter is connected to the head.

4. The filter of claim 1, wherein the filter is connectable to the head by threading, and wherein the first externally protruding rib engages a bottom portion of a valve positioned within the head to shift the valve from a non-flow mode to a flow mode when the filter is connected to the head.

5. The filter of claim 1, wherein the first externally protruding rib and the second externally protruding rib each have an inner surface that is perpendicular to the top end of the endplate and the inner surface faces inward towards the outlet of the endplate,
   the first externally protruding rib and the second externally protruding rib each have an outer surface that is perpendicular to the top end of the endplate and the outer surface faces outwards towards the canister wall,
   the first externally protruding rib having a smaller radius than the second externally protruding rib, and
   the outer surface of the first externally protruding rib and the inner surface of the second externally protruding rib do not make contact with each other.

6. A filtration apparatus, comprising:
   an outer wall extending from an open head end to a base end, the wall defining an internal cavity, the head end including an endplate having a top surface, and at least one inlet and an outlet;
   a filtration media positioned within the internal cavity, the filtration media fluidly connecting the at least one inlet and the outlet;
   a gasket having a bottom surface and a top surface, the bottom surface of the gasket is disposed on the top surface of the endplate;
   wherein the endplate further includes a first plurality of externally protruding arcuate members, the first plurality of externally protruding arcuate members substantially spanning a circumferential portion of the head end at a first radius;
   wherein the endplate further includes a second plurality of externally protruding arcuate members, the second plurality of externally protruding arcuate members substantially spanning a circumferential portion of the head end at a second radius that is larger than the first radius; and
   wherein the first plurality of externally protruding arcuate members and the second plurality of externally protruding arcuate members project upwardly from the top surface of the endplate such that the externally protruding arcuate members extend above the top surface of the gasket.

7. The apparatus of claim 6, further comprising a head substantially adjacent to the head end of the filtration apparatus, comprising:
   an outlet, an inlet, and a valve with a first end and a second end, at least a portion of the valve positioned within the inlet of the head, the valve having a first mode in which a fluid substantially flows through the interior of the valve from the first end to the second end and a second mode in which the fluid does not substantially flow through the interior of the valve from the first end to the second end;

wherein there is a spin-on connection between the endplate and the head, and wherein at least one of the first and second plurality of externally protruding arcuate members depress the second end of the valve to shift the valve from the second mode to the first mode.

8. The apparatus of claim 7, wherein at least one externally protruding arcuate member from the first plurality of externally protruding arcuate members and at least one externally protruding arcuate member from the second plurality of externally protruding arcuate members engage the second end of the valve to shift the valve from the second mode to the first mode.

9. The apparatus of claim 8, wherein an outlet of the filtration apparatus is centrally located, and wherein the filtration media is a substantially annular filtration media that surrounds a central column, the central column defining a plurality of openings therein, the filtration apparatus having a flow path from the filtration apparatus inlet to the filtration apparatus outlet that extends through the filtration media and the plurality of openings in the central column.

10. The apparatus of claim 8, wherein the head further includes a spring retained in the head inlet between a first land defined in the head inlet and a second land defined by a portion of the valve positioned within the head inlet.

11. The apparatus of claim 7, wherein a portion of the head substantially adjacent the head inlet includes at least one stand off pin, and wherein neither the first externally protruding arcuate member nor the second externally protruding arcuate member overlap the stand off pin.

12. The filtration apparatus of claim 6, wherein the endplate has threads to engage with a head.

* * * * *